(No Model.) 4 Sheets—Sheet 1.
W. W. IFE.
REVOLVING DOOR.
No. 596,029. Patented Dec. 21, 1897.
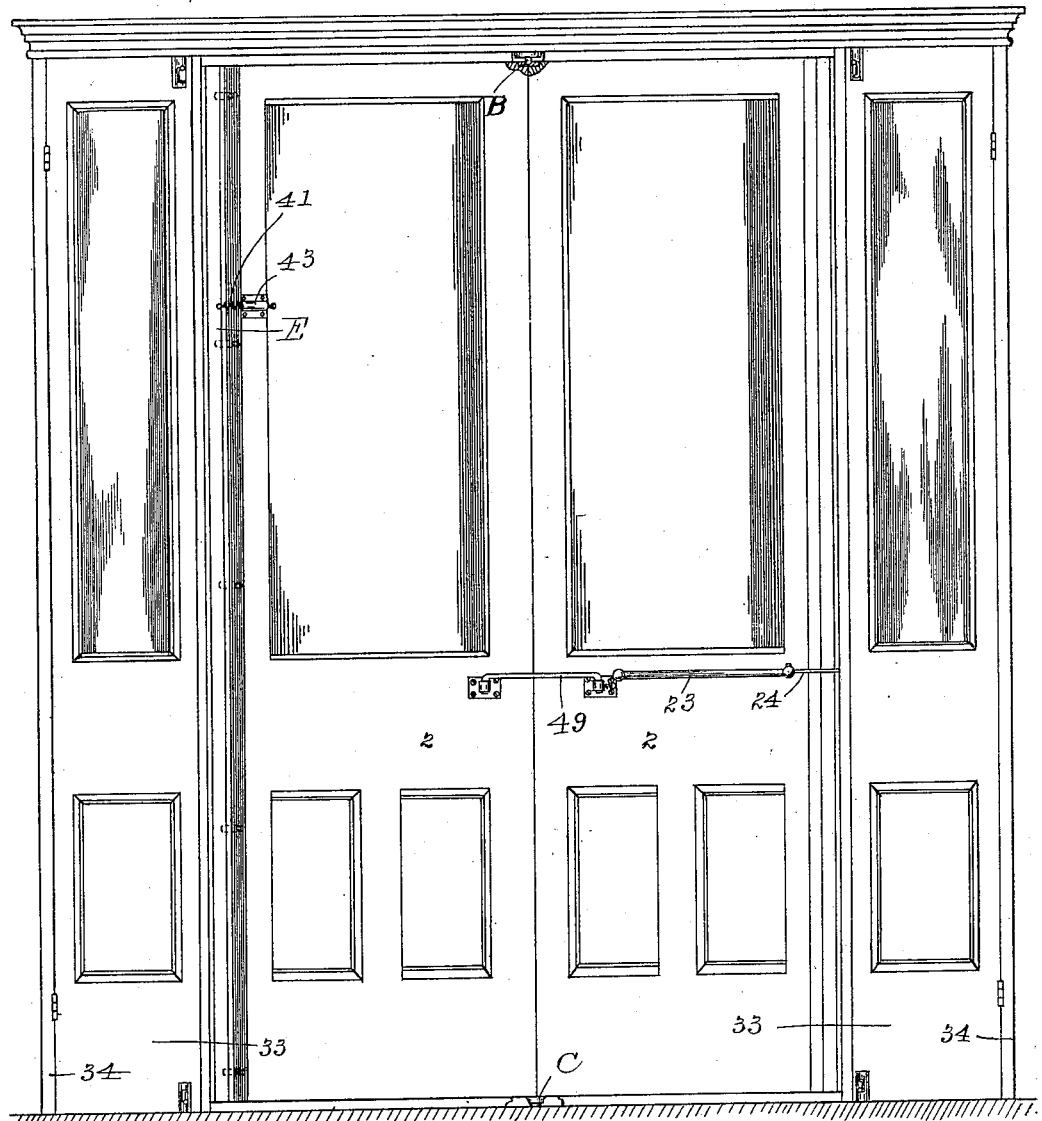
Fig. 1.
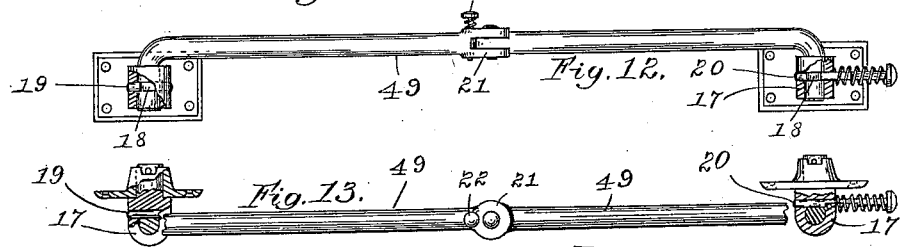
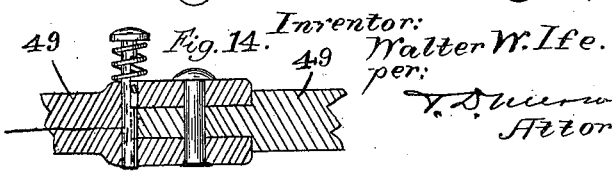
Witnesses: Inventor:
Walter W. Ife.
per:
Attorney.

(No Model.) 4 Sheets—Sheet 2.
W. W. IFE.
REVOLVING DOOR.
No. 596,029. Patented Dec. 21, 1897.
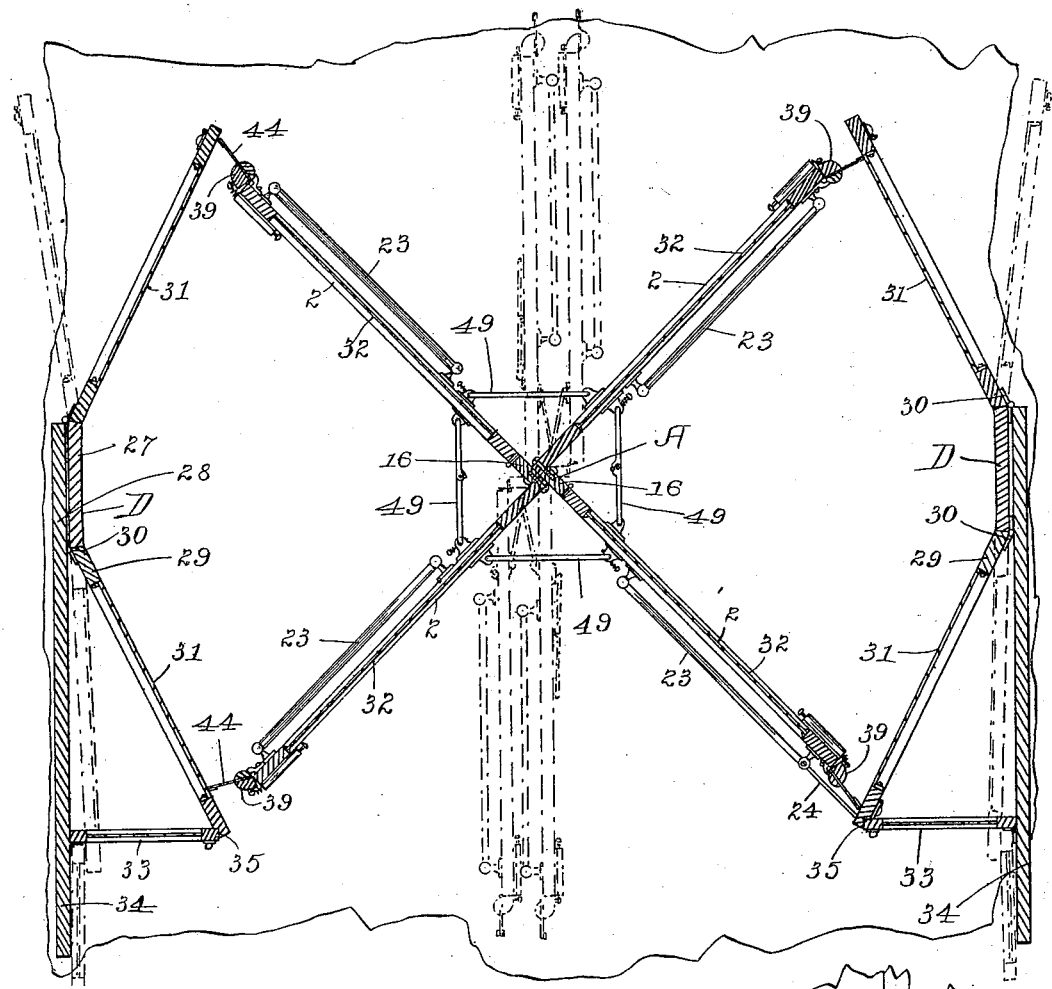
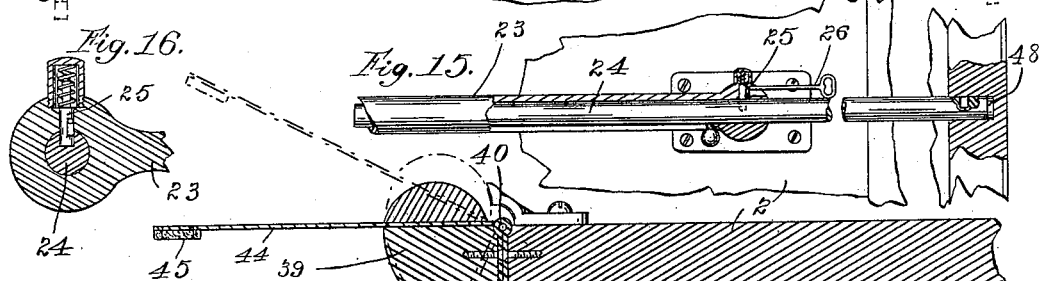
Witnesses: Inventor:
Walter W. Ife,
per: Attorney.

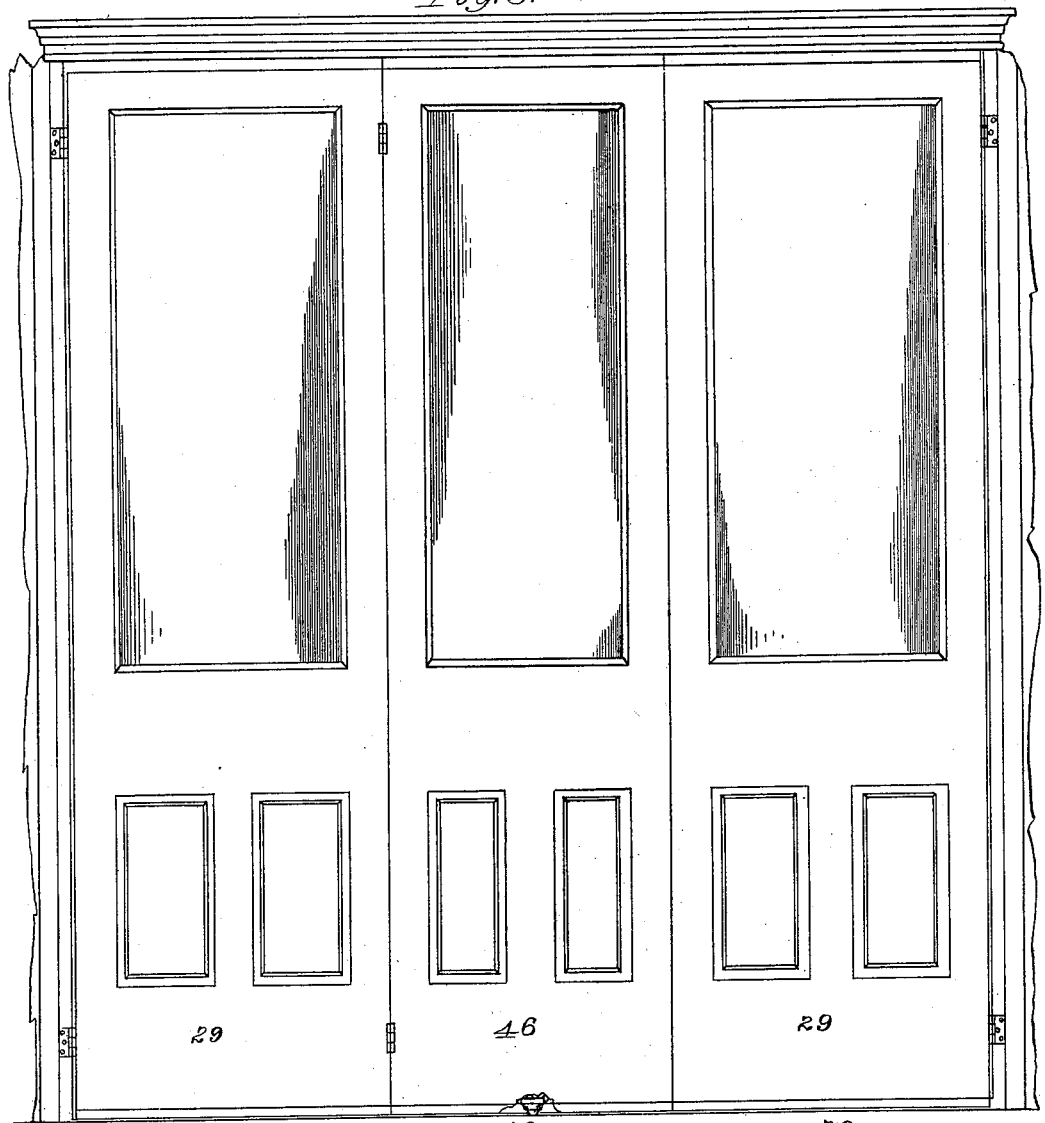

(No Model.) 4 Sheets—Sheet 4.
W. W. IFE.
REVOLVING DOOR.
No. 596,029. Patented Dec. 21, 1897.
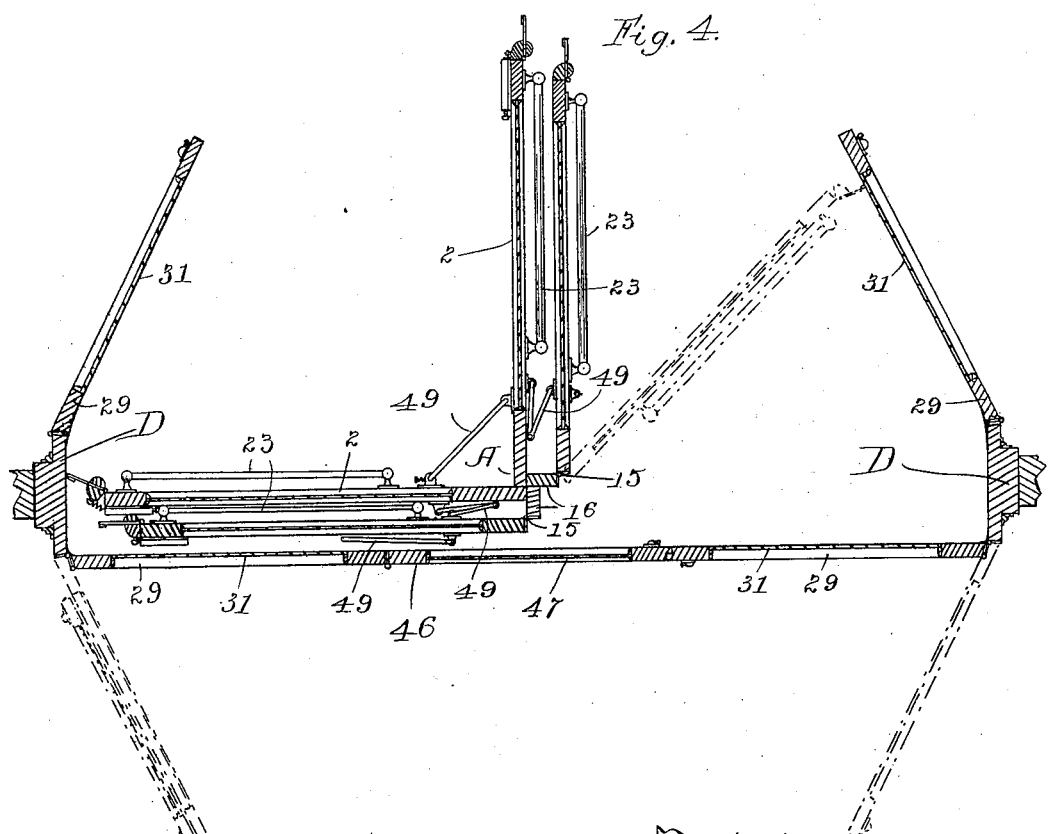
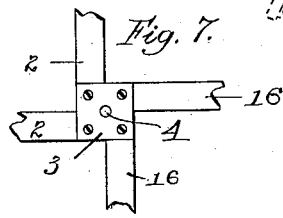
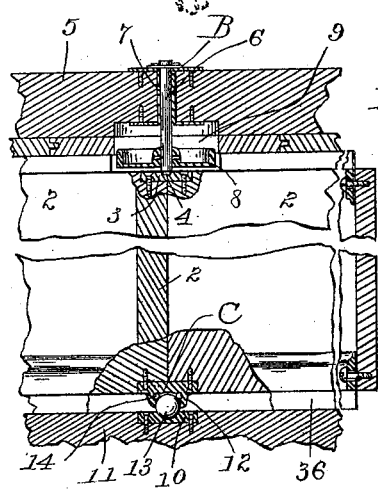
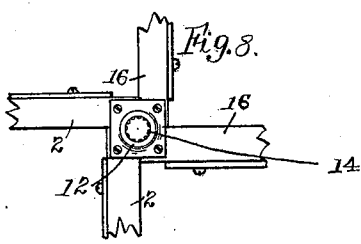
Witnesses:
Inventor:
Walter W. Ife.
per: T. D. Merwin
Attorney.

UNITED STATES PATENT OFFICE.

WALTER W. IFE, OF ST. PAUL, MINNESOTA.

REVOLVING DOOR.

SPECIFICATION forming part of Letters Patent No. 596,029, dated December 21, 1897.

Application filed February 1, 1897. Serial No. 621,547. (No model.)

*To all whom it may concern:*

Be it known that I, WALTER W. IFE, of St. Paul, Ramsey county, Minnesota, have invented certain Improvements in Revolving Doors, of which the following is a specification.

My invention relates to improvements in revolving-door structures designed for outer doorways, especially in public and office buildings, its object being to provide a new and improved structure which while at all times closing the passage against admission of outer air secures the maximum width of aperture and the greatest possible freedom of ingress and egress and permits quick adjustment of the parts, so as to leave the doorway when necessary practically unobstructed, and means for the ready unshipment and removal of the revolving portion from the doorway in the event of a panic.

To this end my invention consists in the features of construction hereinafter more particularly described and claimed.

In the accompanying drawings, forming part of this specification, Figure 1 is an elevation of my improved structure shown locked, as when the building is closed for the night. Fig. 2 is a horizontal section of the structure shown in Fig. 1, the full lines showing the parts in normal position, as in Fig. 1, and the dotted lines their position when set so as to open the passage to permit freedom of ingress and egress without operating the door. Fig. 3 is an elevation of a modified form of structure, looking from outside inward, the same being secured in closed position. Fig. 4 is a horizontal section of the same, the full lines showing the position of the several wings when folded to remain at the rest or in pose when the building is closed—as, for instance, at night. Figs. 5 and 6 are respectively sectional details showing the pivotal connections of the door. Figs. 7 and 8 are respectively detail plan views of the same.
Fig. 9 is a detail of the spring-hinge for holding the casement-wing in normal position. Fig. 10 is a sectional detail of the weather-strips at the top and bottom of the door-wings. Fig. 11 is a sectional detail showing the means for securing glass panels in the structure flush with the face thereof. Figs. 12, 13, and 14 are details of the knuckle-jointed braces for the door-wings, having a spring locking device for the joint and a spring locking-pin for detachably securing one end of the brace to the door-wing. Figs. 15 and 16 are details of the locking device for the door, and Fig. 17 is a sectional detail of the flexible extension upon the edge of the door-wing.

In the drawings, A represents the door, made up of radiate wings 2 and having central top and bottom pivots B and C. These pivots may be of any desired form, but I prefer that shown in the drawings, in which there is a bearing-plate 3 on the top of the door, having a pivot socket or opening 4. In the overhead casing or ceiling 5 of the doorway is arranged a sliding pivot 6, working in the bushing 7. The lower end of the pivot carries a plate 8, through which the pivot projects sufficiently to enter the socket 4 of the plate 3.

A socket 9 in the casing 5 serves to receive the plate 8 when the pivot is thrust upward, as is the case when the door is tilted by the displacement of the lower pivot connections, as hereinafter described. The lower pivotal connection is made up of the socket-plate 10 in the floor 11 and the ball-carrying plate 12, secured to the bottom of the door and having a ball 13, which turns, preferably, upon the ball-bearings 14, so as to diminish the friction. If the ball 13 is displaced from the socket of the plate 10 by excessive lateral pressure upon the door, as in the event of a panic, the door in tilting strikes the disk 8, thereby lifting the pivot 6, so as to disengage it from the socket-plate 3, when the door can be moved aside bodily, running upon the ball 13 as a caster.

The door-wings 2 may be rigidly connected to each other at the center or may have a hinge connection 15 with a stud 16 to permit the folding of the wings against each other, as illustrated in dot-and-dash lines in Fig. 2 and as also shown in Fig. 4. The adjacent wings are secured together, preferably by means of braces 49, one end of which turns in a socket 17, fixed to one door-wing, the pivot portion of the brace having a circumential groove 18 to receive a securing pin or feather 19, whereby it is secured in the socket. The other end of the brace has a similar pivot entering the socket 17 upon the adjacent door and detachably secured therein by the spring-pressed locking-pin 20, which engages the groove 18 in the pivot. The brace may be made, as shown, either in one piece or of two members having a knuckle-joint connection 21, which may be similarly locked in extended position by a pin 22, as shown in detail Fig. 14.

Each door-wing is provided with a hand-rail 23, one of said rails being preferably provided with a locking-bolt 24, which works in the same and may be shot out, so as to lock the door, in the manner hereinafter described. This bolt is secured in either extreme position by means of a lock 25, adapted to be operated by means of a key 26.

The door is provided with a casement D on each side of the doorway, each casement being made up of a fixed medial substantially plane-surfaced section 27, secured to the door-jamb 28, and similar sections 29, connected by means of spring-hinges 30 to the section 27. The springs of the hinges tend to hold the sections 29 inturned toward the door, so as to form a concave polygonal casement, as shown in Figs. 2 and 4, within which the door is adapted to be rotated.

The sections 29 are preferably provided with glass panels 31, so as to present the least possible obstruction to light. The door-wings are also preferably provided with glass panels 32 for a like purpose. The casement-sections on the outside of the doorway are preferably held in inturned or normal position merely by the springs of their hinges, so that in case of panic excessive pressure upon the door will unship it from its bearings, as hereinbefore described, and permit it to be carried out of the doorway, the sections being pressed outward thereby, leaving the maximum width of the doorway clear and unobstructed. The inwardly-projecting sections are preferably locked in their inturned or normal positions by means of bracing or supporting panels 33, hinged to the casing 34 of the doorway, and their outer edges adapted to engage notches 35 in the edges of the sections 29.

When it is desired to throw the doorway open, as in summer use, the sections 33 are folded back against the doorway-casing, as shown in Fig. 2, when the winged sections 29 can also be folded back against the casing and there secured by any suitable holders. The hinged wings of the door may also be folded together, as indicated by dot-and-dash lines in Fig. 2, by releasing and breaking the joints of the knuckle-braces, so as to give perfect freedom of ingress and egress on each side of the doorway.

The space between the bottom of the door and the floor, and the top of the door and the ceiling or upper casing of the doorway, is preferably closed by flexible strips 36, set into the edges of the door-wings, as shown in Fig. 10. The glass panels arranged in the casement-sections are arranged flush with the inner face of the section by means shown in detail Fig. 11. The stiles and rails 37 of the section are beveled, converging outward, and the panel has its edges correspondingly beveled to fit closely within the same and being held in place by securing-strips 38.

In order to secure a close fit between the door and the casement during the rotation of the former, owing to the polygonal form of the casement and the varying radial distance from the axis of the door to the casement I provide elastic extension-strips E upon the edges of the door-wings. These may be of any suitable construction, but I prefer that herein shown and described, in which a strip 39 is connected by hinges 40 to the edge of the door and is held normally abutted against the same by means of a spring 41, the tension of which is adjusted by a screw 42, the spring being protected by a suitable casing 43. The strip 39 is fitted with elastic webbing 44, which is of such width that standing in the plane of the door-wing it will equal the greatest radial distance from the axis of the door to the corners of the casement, but will flex bodily, and the strip 39 will turn against the tension of its spring, so as to partially fold the extension-piece back to adapt itself to shorter radii. To protect the webbing 44 and render the action of the door as near as possible noiseless, I secure upon its edge felt strips 45, which make contact with the casement.

In Figs. 3 and 4 is shown a modified form of structure in which the inner casement-sections are provided with hinges, so as to turn inward as well as, or instead of, outward, and may be thus turned across the doorway, as shown in Fig. 4, when the wings of the door are folded. With this construction one of the casement-sections is provided with a supplemental section 46, hinged thereto, and preferably provided with a glass panel 47, which suffices to fill the space between the edges of the casement-sections when turned across the doorway, and to interlock with the opposite casement-section, so as to entirely close the doorway when it is desired so to do for the closing of the building for the night.

The manner of adjusting, handling, and operating the structure can be clearly understood from the drawings and foregoing description. The door being set in place in the doorway, with its pivot connections in position, the wings are set in radial position and locked by their braces. The casement-sections are then set in converging position and the door is in readiness for operation.

In case of panic or when it is desired to remove the door for the purpose of repair or otherwise it may be pushed out of the doorway by simply slightly excessive pressure on opposite wings, the caster at the bottom being unshipped from its socket and the tilting of the door serving to unship the top pivot, when the door may be moved along the floor of the doorway, running upon the caster, the outer casement-sections being pressed outward.

When it is desired to throw the doorway open without removing the door, the jointed door-wing braces are disconnected or folded and the alternate wings of the door folded upon the adjacent ones, the wings standing in line with the passage-way. The casement-sections then being turned outward against the side walls of the passage or door way, perfect freedom of ingress or egress is permitted for persons and for the carrying therethrough of furniture and the like.

When the building is to be closed for the night, the locking-bolt 24 may be shot outward into the socket 48 in one of the casement-sections, so as to prevent the rotating of the door.

In the form of structure shown in Figs. 3 and 4 the door-wings are folded upon each other and the inner casement-sections turned across the doorway, with the extension-piece upon one interlocking with the other, thus entirely closing the doorway.

I claim—

1. The combination with a revolving door of the class described, having flexible or automatically-extensible edge portions, of the concave, oppositely-arranged casements therefor made up of the medial parallel sections, and converging sections on each side of said parallel sections.

2. The combination with a revolving door of the class described, of similar, oppositely-arranged concave casements therefor, each made up of a series of substantially plane-surfaced sections, the converging sections being provided with glass panels.

3. The combination with a revolving door of the class described, of the adjacent, similar opposed concave casements, each made up of the three substantially plane-surfaced sections, the medial sections of the two casements being parallel, and the side sections converging, and the glass panels arranged in the converging sections flush with their inner faces.

4. In combination with a revolving door of the class described, the oppositely-arranged similar concave casements, each made up of three plane-surfaced sections, the medial sections of the two casements being parallel with each other, and the converging sections being hinged thereto.

5. In combination with a revolving door of the class described, the opposite, similar, concave, polygonal casements, each casement being made up of three sides or sections, the medial section being fixed, and the connected sections hinged thereto, and provided with glass panels flush with their inner faces.

6. In a structure of the class described, the combination with the revolving door, of the three-sided polygonal casement, the medial section or side being fixed, and the others hinged thereto, the springs for normally holding said hinged sections inturned or converging, and the glass panels in said hinged sections arranged flush with their inner faces.

7. In a structure of the class described, the combination with the revolving door, of the opposite, similar, concave, three-sided polygonal casements, the medial section of each being fixed and the side sections hinged thereto, means for elastically holding the hinged sections inturned or converging toward the door, the stop limiting said inturned movement, and the glass panels in said hinged sections flush with their inner faces.

8. In a structure of the class described, the combination with the revolving door, its pivots, and the inclosing door-casements, of the traveling connections or supports for said pivots arranged to yield to a predetermined excess of pressure so as to carry the door bodily out of the casements.

9. In a structure of the class described, in combination the fixed casements, the door arranged to rotate within the same, and the traveler pivots for said door adapted under normal conditions to hold the door in place within the casements, but under excess of pressure to carry the door out from said casements.

10. The combination with the revolving door, of the concave but non-circular casement therefor, the extension-strips upon the wings of said door, and means for holding said strips in constant bearing-contact with the adjacent casement.

11. The combination with the revolving door having radiating wings, of the concave but non-circular casements therefor, and the flexible extension-strips upon the wings of said door adapted to maintain constant contact with the adjacent casement in the operation of the door.

12. In a revolving-door structure, the polygonal concave casements and the spring-controlled hinge connection for the outwardly-projecting parts of said casements tending to hold them in inturned position, but yielding to pressure outwardly.

13. In a structure of the class described, the combination with the revolving door and concave casements therefor, of glass panels arranged in said casements substantially flush with the inner faces thereof.

14. In a structure of the class described, the combination with the hinged casement-sections, of supporting hinged sections or panels interposed between the edges of said casement-sections and the wall of the doorway.

15. In a structure of the class described, the combination with the hinged casement-sections, of bracing-sections interposed between the edges of said casement-sections and the side walls, and provided with glass panels.

16. In a structure of the class described, the combination with the door, of the central ball-caster upon the same, the floor-socket to receive the caster, and the yielding top pivot, whereby the door is adapted to be held under ordinary circumstances in rotative position, but will be unshipped from its pivotal supports under excessive lateral pressure.

17. In a structure of the class described, the combination with the revolving door, of the caster-pivot for the same, made up of a socket-piece upon the door, the ball-caster fitted thereto, and the ball-bearings for the same in said socket.

18. In a structure of the class described, the combination with the revolving door, of the ball-caster secured to the bottom of the same, and adapted to fit into a floor-socket, a pivot-pin fixed in the ceiling of the doorway, and adapted to fit into a socket in the top of the door, and being free to be moved vertically, and the plate or disk carried by said pivot, and standing normally close to the door, whereby the unshipping of the caster from its socket will cause the door to tilt and lift said plate and pivot out of engagement with it, and permit it to be carried out of engagement with the doorway.

19. In a structure of the class described, the combination with the hinged casement-sections, of a supplementary section hinged to the outer edge of one of said sections, and adapted to be folded across the doorway, so as to interlock with the opposite casement-section, and thereby close the doorway.

20. In a structure of the class described, in combination with the wing of the door, of a hollow hand-rail therefor, the locking-bolt working in said hand-rail, and the socket in the casement to receive said bolt, so as to lock said door in fixed position.

21. In a revolving-door structure, the combination with the casement thereof, and the jamb or side wall of the building-doorway, said casement and jamb being so constructed and arranged as to permit the admission of light into the intermediate space, of the section interposed between the inner edge of said casement and said jamb or wall, and provided with a glass panel.

22. In combination with a revolving door of the class described, a wing extension-piece, a spring-restrained hinge connection between it and the wing, and the flexible strip carried by said extension-piece.

23. In a revolving door, the combination with the alternating fixed and hinged radiating wings, of the jointed braces for connecting adjacent wings.

24. In combination with the wing of a door of the class described, of a rail hinged to its outer edge, the tension-spring holding the same normally abutting against the edge of the wing, the elastic strip or webbing carried by the same, and the felt edge or binding for said webbing.

25. In combination with a door of the class described, having relatively-movable radiate wings, a jointed brace for connecting the adjacent wings, having pivotal connection with said wings, and a locking device for the joint.

26. In combination with a door of the class described having relatively-movable radiate wings, the interposed jointed brace for adjacent wings, devices engaging the ends of the brace with the wings and the locking device for detachably securing such engagement at one end of the brace to its wing.

27. In combination with a door of the class described, having relatively-movable radiate wings, an interposed brace for adjacent wings having a knuckle-joint, a locking device for said joint to hold the brace extended, the pivotal connections for said brace with the door-wings, and the locking device for detachably securing the free end of the brace to its wings.

28. In combination with a door of the class described, having relatively-movable radiate wings, the jointed braces for connecting adjacent wings, and the means for locking the braces in extended position.

29. In a revolving-door structure, the combination with the concave casements provided with glass panels and the adjacent walls or jambs, of the sections interposed between the inner edges of the casements and said jambs or walls, and provided with glass panels.

In testimony whereof I affix my signature in presence of two witnesses.

WALTER W. IFE.

Witnesses:
T. D. MERWIN,
MINNIE L. THAUWALD.